(12) United States Patent
Paltenghe et al.

(10) Patent No.: US 7,200,578 B2
(45) Date of Patent: Apr. 3, 2007

(54) METHOD AND SYSTEM FOR ANONYMIZING PURCHASE DATA

(75) Inventors: Cris T. Paltenghe, Northridge, CA (US); Alnoor B. Mamdani, Venice, CA (US); Melvin M. Takata, Thousand Oaks, CA (US); Gregory Lee Huddleston, Huntington Beach, CA (US)

(73) Assignee: Citicorp Development Center, Inc., Los Angeles, CA (US)

( * ) Notice: Subject to any disclaimer, the term of this patent is extended or adjusted under 35 U.S.C. 154(b) by 289 days.

(21) Appl. No.: 09/190,727

(22) Filed: Nov. 12, 1998

(65) Prior Publication Data

US 2001/0011250 A1 Aug. 2, 2001

Related U.S. Application Data

(60) Provisional application No. 60/081,748, filed on Apr. 14, 1998, provisional application No. 60/065,291, filed on Nov. 12, 1997.

(51) Int. Cl.
*G06F 17/60* (2006.01)
(52) U.S. Cl. .............................. 705/74; 705/1; 705/14; 705/26; 705/74
(58) Field of Classification Search .................... 705/1, 705/10, 14, 26, 74
See application file for complete search history.

(56) References Cited

U.S. PATENT DOCUMENTS

| | | | | |
|---|---|---|---|---|
| 5,420,926 A | * | 5/1995 | Low et al. ..................... | 705/74 |
| 5,557,518 A | * | 9/1996 | Rosen .......................... | 705/69 |
| 5,675,662 A | | 10/1997 | Deaton et al. ................. | 382/137 |
| 5,794,210 A | * | 8/1998 | Goldhaber et al. ........... | 705/14 |

(Continued)

FOREIGN PATENT DOCUMENTS

EP 0 370 146 A1 5/1990

(Continued)

OTHER PUBLICATIONS

Anonymous, "Frequent-Shopper Plans Get a Chipper Look", POS News, Jan. 3, 1995.*

(Continued)

*Primary Examiner*—Bradley B. Bayat
(74) *Attorney, Agent, or Firm*—George T. Marcou; Kilpatrick Stockton LLP

(57) ABSTRACT

A system, in which information is the primary asset and in which investments may be made in information, includes multiple data stores for storing different types of a user's information. The safe, secure and properly authorized transfer of information while preserving individual privacy is provided. The system also provides for secure backup and storage, as well as for ubiquitous and nomadic access to information while maintaining the privacy of such information. A first data store includes static identification data about a user. A second data store includes moderately dynamic personal data about the user. A third data store includes dynamic demographic information data about the user. An electronic wallet can be used with the system to download selected portions of the data for use by the user. A method of use of the data includes using the data for billing out forms, providing services to the user and allowing merchants to selectively target users for sales while maintaining user anonymity.

3 Claims, 14 Drawing Sheets

U.S. PATENT DOCUMENTS

| | | | | |
|---|---|---|---|---|
| 5,815,665 A | * | 9/1998 | Teper et al. | 705/26 |
| 5,878,403 A | * | 3/1999 | DeFrancesco et al. | 705/38 |
| 5,884,270 A | * | 3/1999 | Walker et al. | 705/1 |
| 5,884,271 A | * | 3/1999 | Pitroda | 705/1 |
| 5,890,137 A | * | 3/1999 | Koreeda | 705/26 |
| 5,913,202 A | * | 6/1999 | Motoyama | 705/35 |
| 5,956,700 A | * | 9/1999 | Landry | 705/40 |
| 5,961,593 A | * | 10/1999 | Gabber et al. | 709/219 |
| 5,966,697 A | * | 10/1999 | Fergerson et al. | 705/26 |
| 5,987,440 A | * | 11/1999 | O'Neil et al. | 705/44 |
| 5,995,965 A | * | 11/1999 | Experton | 707/10 |
| 6,018,718 A | * | 1/2000 | Walker et al. | 705/14 |
| 6,029,141 A | * | 2/2000 | Bezos et al. | 705/27 |
| 6,029,150 A | * | 2/2000 | Kravitz | 705/26 |
| 6,061,789 A | * | 5/2000 | Hauser et al. | 713/168 |
| 6,119,101 A | * | 9/2000 | Peckover | 705/26 |

FOREIGN PATENT DOCUMENTS

| | | |
|---|---|---|
| EP | 0 775 990 A2 | 5/1997 |
| EP | 0 788 080 A2 | 8/1997 |
| EP | 0 908 855 A2 * | 4/1999 |
| WO | WO 97/15023 | 4/1997 |
| WO | WO 98/52159 * | 11/1998 |

OTHER PUBLICATIONS

Goodman, John, "Leveraging The Customer Database To Your Competitive Advantage", Direct Marketing, vol. 55, No. 8, pg. 26, Dec. 1992.*

Anonymous, "Quaker Direct Tracks Buying At Household Level", Abstract, Preminum Incentive Business, vol. 49, No. 3, Mar. 1990.*

Kerwin, Ann Marie, "Added-Value Marketing Plans", Editor & Publisher, vol. 125, No. 50, pp 22-27, Dec. 12, 1992.*

Anonymous, "Nielsen and Hispanic Market Connections Announce Joint Development of Hispanic Consumer Panel in U.S. Breakthrough Service to Consider Unique Cultural and Demographic Characteristics", Dialog File 813:PRNewswire, Oct. 3, 1994.*

Shermach, Kelly, "Electronic Coupon Program Offers Data-Base Potential", Marketing News, vol. 29, No. 20, Sep. 1995.*

Tange, H. J. et al., *Medical narratives in electronic medical records*, International Journal of Medical Informatics. 46 1997, pp. 7-29.

European Search Report, date Nov. 28, 2000.

Examination Report issued by Australian Patent Office for Singapore Application No. SG 9804644-4, dated Apr. 10, 2002 (mailing date).

Written Opinion issued by Australian Patent Office for Singapore Application No. SG 9804644-4, dated Jun. 23, 2000 (mailing date).

Search Report issued by Australian Patent Office for Singapore Application No. SG 9804644-4, dated Nov. 19, 1999.

* cited by examiner

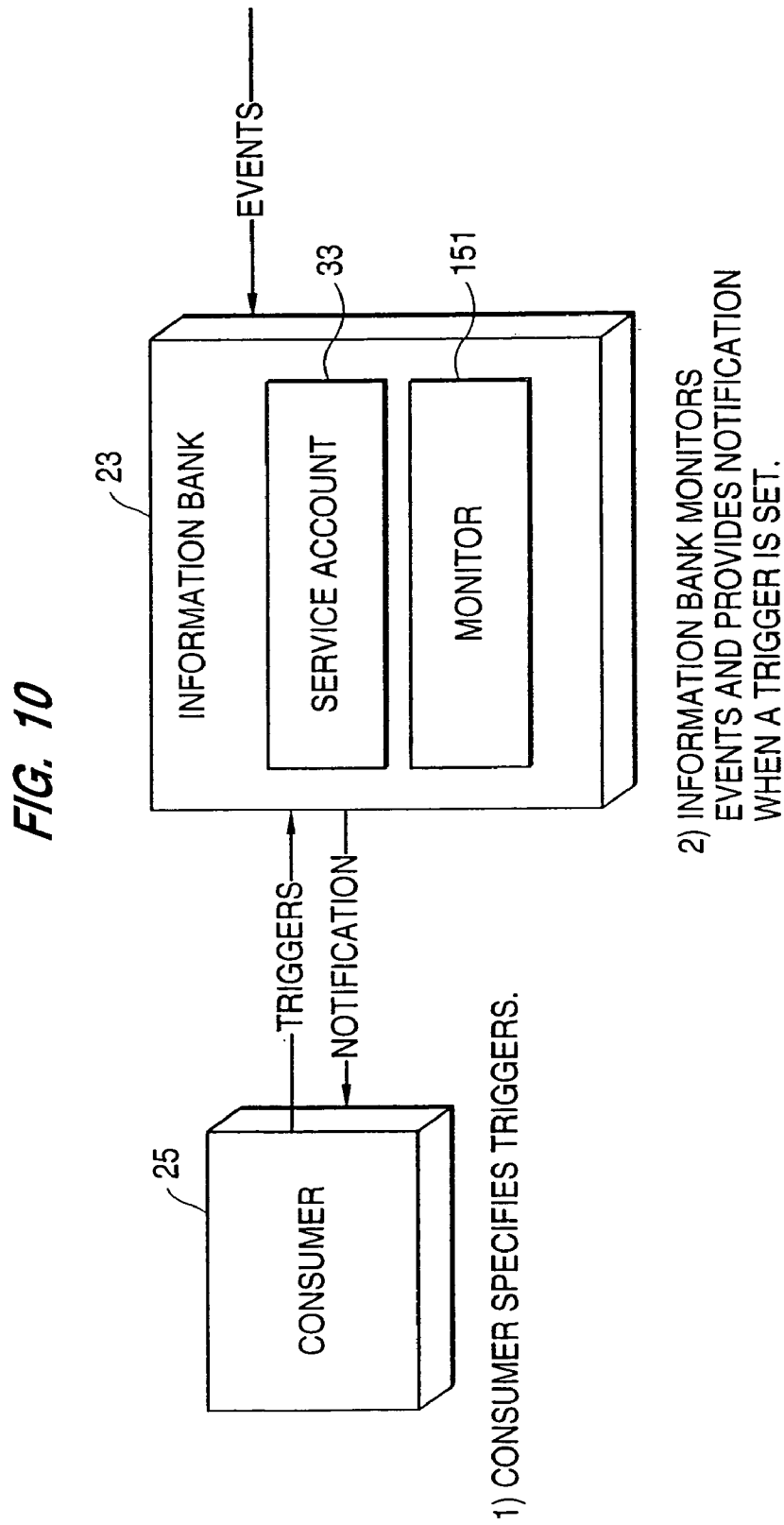

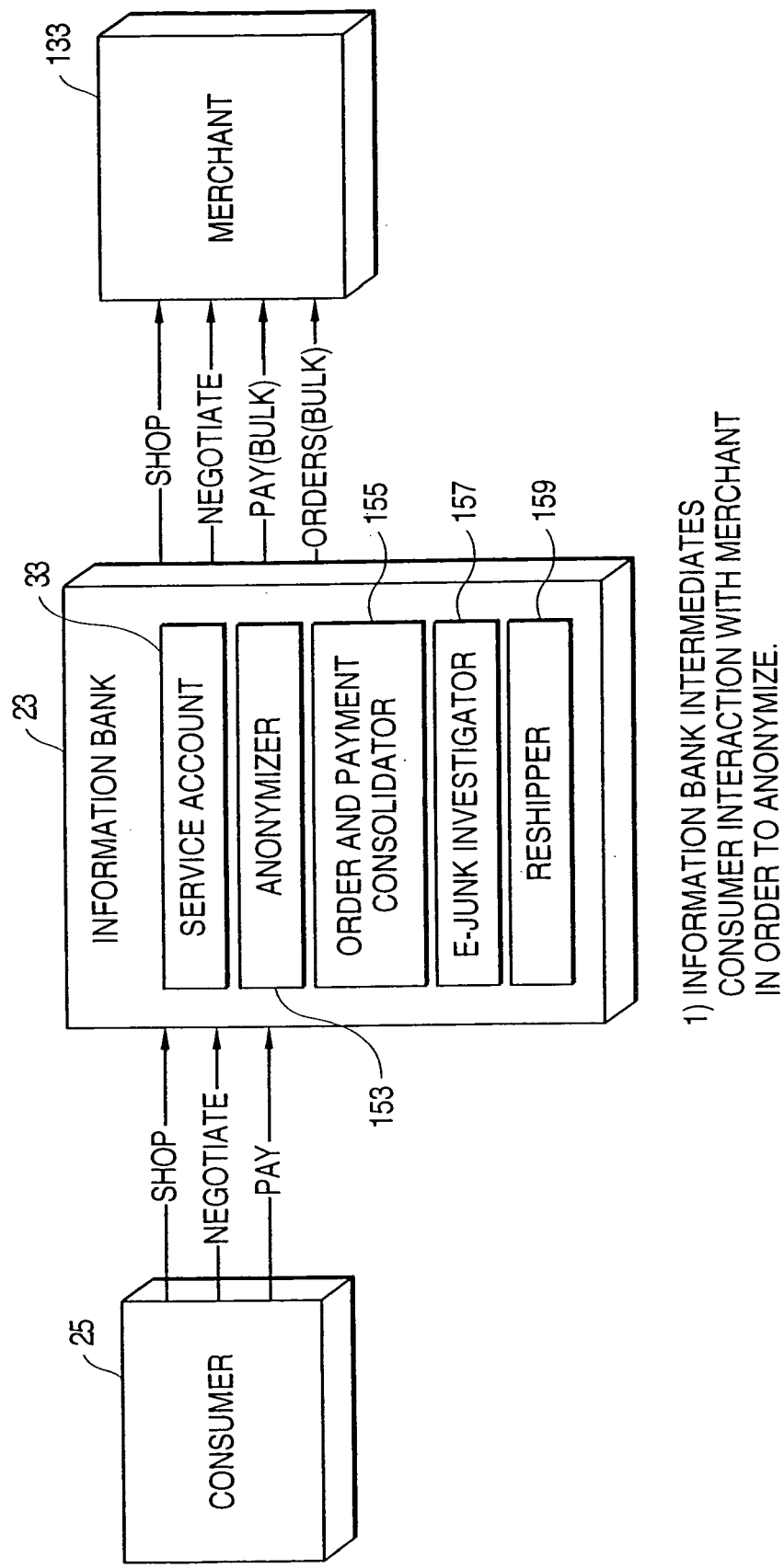

FIG. 12

INFORMATION BANKING

| COURTESY ACCOUNT | SERVICE ACCOUNT | INTEREST BEARING ACCOUNT |
|---|---|---|
| DEFINITION<br>A FREE ACCOUNT THAT CONSUMERS GET AS A COURTESY FOR BEING A CUSTOMER. CERTAIN SERVICES THAT COME WITH IT ARE ALSO GRATIS. | DEFINITION<br>A CONSUMER PAYED FOR ACCOUNT. THEY PAY FOR LONG TERM, GUARANTEED SAFE STORAGE; AND EXTERNAL ACCESS BY AUTHORIZED PEOPLE (DR'S, ACCNTNT'S, ETC.) | DEFINITION<br>IN RETURN FOR MAKING CERTAIN PERSONAL TYPES OF INFORMATION AVAILABLE, THE CONSUMER IS PAYED A PORTION OF THE RECEIPTS OF SELLING THAT DATA. NO NAMES NOR ADDRESS ARE EVER REVEALED. |
| CHARACTERIZED BY:<br>SMALL AMOUNT OF DATA<br>RELATIVELY STATIC<br>INDEFINITE STORAGE TIME | CHARACTERIZED BY:<br>LARGE AMOUNT OF DATA<br>DYNAMIC<br>STORED OVER LONG PERIODS OF TIME | CHARACTERIZED BY:<br>DEMOGRAPHIC DATA<br>USERS INTERESTS<br>USER PROFILES<br>USER AGENTS |
| EXAMPLES:<br>NAME, ADDRESS, PHONE, SOCIAL SECURITY #, AND OTHER COMMONLY ASKED FOR INFORMATION ON FORMS, APPLICATIONS, ETC. | EXAMPLES:<br>BILLING HISTORY, PAYMENT HISTORY, LOANS, REAL ESTATE HOLDINGS, STOCK, BOND, FUND HOLDINGS, MEDICAL RECORDS, HOME WEB PAGES, ETC. | EXAMPLES:<br>AGE, GEOGRAPHIC LOCATION, RACE, RELIGION, PROFESSIONAL INTERESTS, HOBBY INTERESTS, FREQUENT PURCHASE CATEGORIES, EXPLICIT REQUESTS FOR INFORMATION, EXPLICIT REQUESTS FOR BLOCKING CATEGORIES OF INFORMATION |
| SERVICE EXAMPLES:<br>AUTOMATED FORM FILLING<br>SAFE SHOPPING<br>GENERAL E-COMMERCE | SERVICE EXAMPLES:<br>BILL PRESENTMENT/PAYMENT<br>RELATIONSHIP MANAGEMENT<br>ANYWHERE, ANYTIME ACCESS<br>GUARANTEED DATA SAFE<br>TAX PREPARATION EMERGENCY<br>INFORMATION FOCAL POINT | SERVICE EXAMPLES:<br>SOLICITED AGENT SEARCHS<br>PAY TO CONTACT UNSOLICITED OFFERS<br>MARKET RESEARCH<br>ELECTRONIC CENSUS<br>PROFILE ORIENTED SPECIAL OFFERS |
| FREE TO CONSUMER | CONSUMER PAYS | CONSUMER GETS $$ |

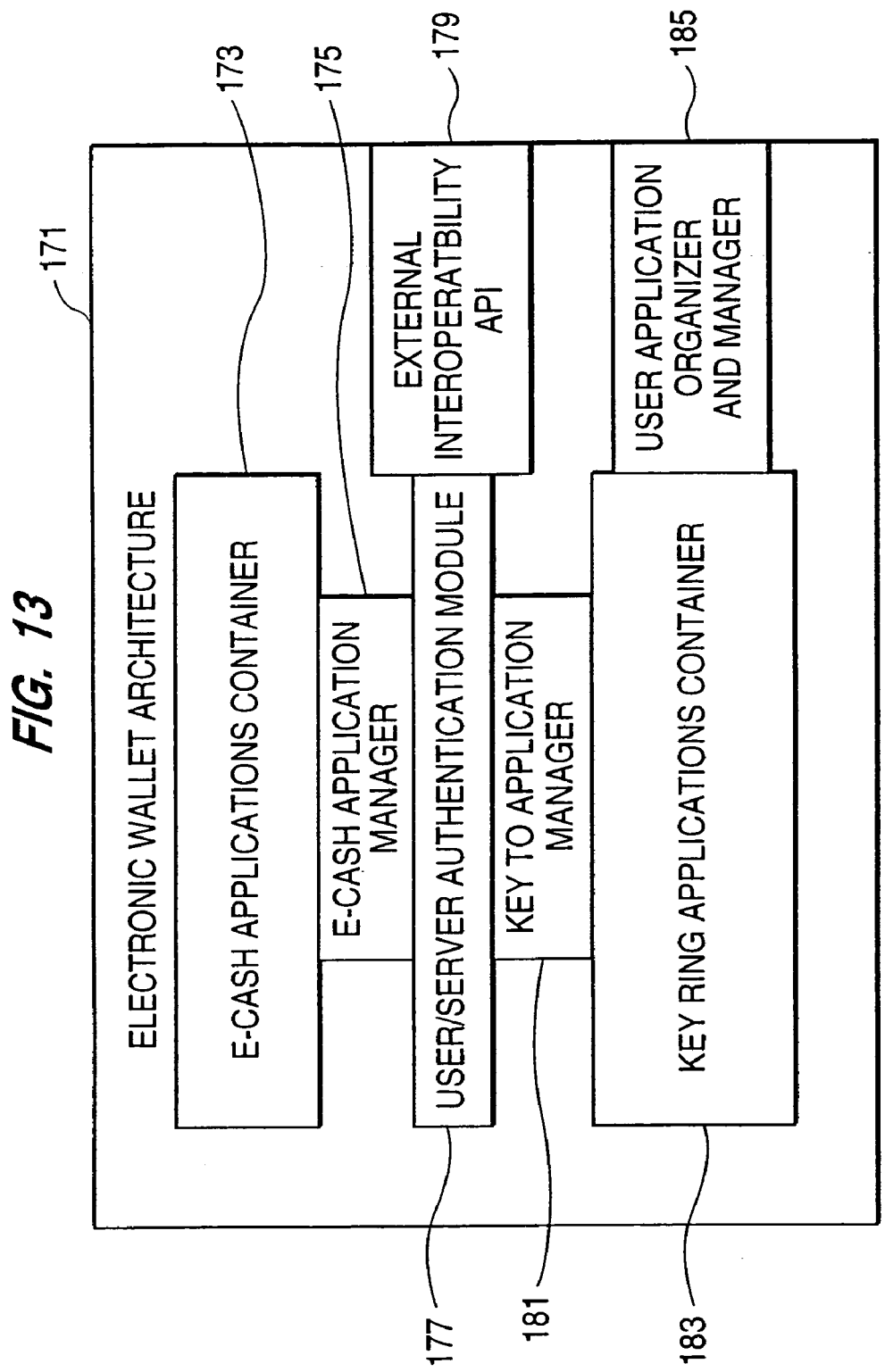

METHOD AND SYSTEM FOR ANONYMIZING PURCHASE DATA

CROSS REFERENCE TO RELATED APPLICATIONS

This application is related to Provisional Patent Application No. 60/065,291 entitled "Distributed Network Based Electronic Wallet," filed on Nov. 12, 1997 and to Provisional Patent Application No. 60/081,748 entitled "Virtual Wallet System" filed on Apr. 14, 1998, to which priority is claimed.

FIELD OF INVENTION

This invention relates to information storage and retrieval systems, and more particularly, to an electronic system for storage and authorized distribution of personal information.

BACKGROUND OF INVENTION

In today's information-based economy, information is recognized by many corporations as a primary asset which, much like currency, fully realizes its value only with frequent use. Information is an important asset not only for corporations, but also for individuals who often need to repetitively provide certain personal facts to merchants and service providers with whom they do business.

Collections of personal information, in the form of demographics, are invaluable to companies wishing to conduct targeted marketing campaigns. Examples of information collections include insurance policies, legal documents, medical records, and financial and credit histories. This information represents a valuable commodity which many corporations are willing to purchase.

In fact, many companies are known to massage their consumer accounts to create mailing lists which can be sold. Likewise, most consumers know this happens, and are not surprised to receive a barrage of catalogs from previously unknown vendors after placing a mail order for goods. Many consumers are annoyed by this practice and some may even avoid the offending vendor in the future in order to prevent further abuse of their personal information. However, most of these consumer concerns could be eliminated, or at least reduced, if this data were first scrubbed or sanitized to remove all references to the particular individual before being made available as marketing data.

Privacy is a growing concern in the internet and electronic commerce arena because each time you enter a site, your browser already tells the server a lot about you, such as which browser you're using and your IP address. This makes it easy for data miners to track site visits and strip information from unsecured data transmissions. In response, the Internet business community is promoting Open Profiling Standards (OPS) which allow individuals to save personal information on a hard drive on their PC and only allow others to access portions of this information after the individual grants permission.

There is also concern over the use of cookies, or tokens that are attached to a user program and change depending on the web site areas entered. When you enter a web site using cookies, you may be asked to fill out a form providing information such as your name and interests. This information is packaged into a cookie and sent to your web browser which stores it for later use. The next time you go to the same web site, your browser will send the cookie to the web server. The server can use this information to present you with custom web pages. Cookies are typically designed to be persistent and remain in the browser for long periods of time, and can be used to unknowingly disclose the address of the site you most recently visited, or movements within a site.

Consumers also increasingly want to systematically organize and secure personal information but are generally limited in their ability to do so by the availability of commercial software programs. For example, certain financial planning and management software packages provide a facility for storage of personal information on the consumer's PC. This practice can be vexing if the PC subsequently experiences an anomalous operation or a system malfunction. There is then a need for a system which would allow personal information to be professionally backed-up, thus protecting against mishap, natural disaster, negligence, or even PC theft.

Consumers also want the ability to control and define access to their information, using presently available technology to securely and privately store, sort and/or exchange information. There is then a need for a third party who would provide these types of services with a primary aim of preserving its consumers' personal privacy.

SUMMARY OF THE INVENTION

In one aspect the invention provides a system for the selective organization, access to and use of personal data. The system may include a server having data storage capability for storing different types of personal data in distinct data stores, i.e., an "information bank", such that the information may be efficiently used by the consumer and by institutions which the consumer has authorized to access the data. A first data store may include what is known as static identification data which is personal to a user such as a consumer and which is typically necessary for establishing a relationship between the consumer and an institution. Such a consumer will have a means to access the static identification data, such as a personal computer, network computer, smart telephone or other communication device through the Internet or other network connection or wireless connection. A second data store may include what is known as moderately dynamic personal data about a user or many users, again a consumer or consumers. This would typically include a large volume of data which may be difficult to manage and which is stored primarily for the convenience of the consumer. A third data store may include dynamic demographic information data about the users or consumers. This data may be mined from the data stores mentioned above, or may be the result of information provided by the consumer, for example, in response to surveys. Typically, this information is valuable to many research and marketing institutions which may directly or indirectly compensate the consumer for access to the information.

For purposes of the disclosure herein, by the term "static identification data" is intended to mean a relatively small amount of data which is relatively static and which is typically necessary for establishing a relationship between the consumer and an institution. This type of data is stored for an indefinite period of time, typically at no cost to the customer. Examples of this type of data include name, address, phone number, social security number and other commonly asked for information on forms, applications, etc. This type of data can be used in services provided by an institution such as a bank as a free account to permit activities such as automated form filling, safe shopping and general electronic commerce. Such an account file can generally be referred to as a "courtesy account."

With respect to "moderately dynamic personal data", this is intended to mean a large amount of data, which is dynamic and which is stored over long periods of time. Such types of data includes, for example, billing history, payment history, loans, real estate holdings, stock, bond, fund holdings, medical records, home web pages and the like. This type of data can be used in services provided by an institution such as a bank on a charge for service basis, and may be used in the account for bill presentment/payment, relationship management, tax preparation, divergency information (medical records) focal point, and the like. Such an account and file can generally be referred to as a "service account."

As to "dynamic demographic information data", it is characterized by being demographic data including, user interests, user profiles and user agents. Examples include age, geographic location, race, religion, professional interests, hobby interests, frequent purchase categories, explicit requests for information, explicit requests for blocking categories of information. Customers who allow use and transmission of this data to others such as merchants could be paid a portion of receipts of selling that data received by an institution such as bank. The data can be provided to market research organizations, electronic census providers, organizations which provide profile special offers and the like. Such an account and file can generally be referred to as a "value generation account."

More specifically, a consumer's financial institution, by the nature of the transactions in which it engages, already has in its possession large amounts of confidential and disclosure-sensitive information. As may be appreciated from the prior description, examples of this type of information include credit card purchases, income data, bank card transactions, loan application/servicing, etc. Thus, it is optimal for the financial institution to maintain principal possession, maintenance and storage of the types of information described previously for consumer authorized use and distribution, while simultaneously achieving, without the introduction of yet another party, the securing of the consumer's personal information in an "information bank."

In accordance with the invention, the consumer's information may be made available through the financial institution's computer network server, thereby allowing convenient "universal" access to the consumer's personal information, i.e., "static identification data". Thus, access to the consumer's information is only limited by access to standardized devices on computer networks, such as personal computers, i.e., PC's, network computers, PDAs, smart telephones and other communications devices which are connected to the financial institution through the Internet or other network connection. More importantly, the present invention eliminates the need for consumers to have direct access to the consumer's own PC, while at the same time providing required security and access authorization controls.

As noted previously, there is also a need to organize and utilize a much broader range of information, including personal information. This type of information further includes data that is commonly associated with an individual, i.e., the "moderately dynamic personal information", and can be accessed by specific types of organizations or entities such as doctors, tax preparers, etc. Essentially, this information is automatically transferred, upon consumer authorization, to another party in a format that can be used.

Finally, it is also desirable to organize demographic information, i.e., "dynamic demographic information data", from consumers into collections of data for evaluation and use by other institutions and individuals. Many of these institutions and individuals, which include merchants and others engaged in commerce and institutions engaged in research, are willing to pay for access to such information. However, due to privacy concerns it is desirable to make demographic information available without disclosing sensitive information about individual consumers, such as actual name, physical address, e-mail address, telephone number, etc. to an institution. Therefore an inquiring institution, for example a merchant, can come to the institution storing the consumer's data, such as a consumer's financial institution, and request an information-based (e.g., electronic) profile of the kind of consumer to which its products and services would be suited. Such a profile would typically include the number of consumers within the database that met certain criteria. The merchant could then request that the financial institution deliver information or advertisements of its products or services to individuals which meet certain criteria. The financial institution would then deliver the information or advertisement to individual consumers thus preventing direct contact between the merchant and the individual. After the consumer has the opportunity to anonymously review such information, the consumer at its own discretion may choose to contact the merchant.

A portion of the fee charged by the consumer's financial institution for the request and receipt of the consumer information may be used to pay the consumer as an inducement to participate in the transaction. Accordingly, the consumer is investing information for financial and/or non-financial gain. One example of nonfinancial gain might be the receipt of loyalty credits, as in the case of airline mileage points. Therefore, the consumer is remunerated by the financial institution depending on what the business strategy requires.

The system of the information bank can thus provide, in specific aspects, three types of accounts: a courtesy account, a service account, and a value generation account. Basic information can be stored in the information bank courtesy account and used for automated "form filling" services which are useful to the consumer as an easy means for providing personal information to others when and as authorized. This service may also include a digital signing service, a digital signature verification service, and, for example, notary services.

The information bank system's service account is appropriate for larger amounts of consumer generated data which grows steadily over time. The service will provide for secure backup and storage, as well as for "ubiquitous" and "nomadic" access. Service accounts may hold transaction logs, account histories, medical records, insurance information, financial records, etc.

As personal computing devices become more accessible and "connected" through the Internet and other home networks, the requirement for home data storage devices may decrease. Since "standard" consumer software applications such as e-mail and home accounting packages have become readily available across distributed commercial networks, there is now a corresponding need for network based information storage and safekeeping such as is provided in accordance with the invention. One advantage of using networked information storage is that consumers will have access from many locations, and will not have to carry the information with them when they travel, as do people today. The consumer's information can be made securely and privately available, for example, through "set top boxes" i.e., cable system boxes used on television, and having advanced architecture such as RISC based technology, in hotel rooms or on terminals in emergency hospitals upon authorized demand via smart cards or other similar devices.

The service account will also provide software and data backup/archival services for small office/home office (SOHO) proprietors who prefer not to own standard office software applications, and who wish to know that their business records and data are securely and professionally managed.

Another feature of the service account is to provide third party access to otherwise confidential information in the event of accident, emergency, or death. For example, an unconscious accident victim can't provide PIN or biometric access to urgently required medical information. Under these or other appropriate circumstances, the service makes stored medical information such as patient allergies, medications, medical history, etc., available to authorized recipients. This feature also allows estate executors to access information that is required to handle estate matters, for example, private keys.

Storing data in a self describing meta language, such as XML format, facilitates transfer and use of data by third parties. With proper account owner access authorization, the service facilitates access and understanding of stored personal information, which should reduce the dollar and time cost of services provided by third party professional service providers, such as accountants or physicians.

The service account may also include a cryptographic key escrow and recovery service which provides key escrow and recovery service by storing a key pair and certificate copy after these are generated by a browser, or by generating a key pair and certificate and storing a copy. The service then provides a replacement copy of the key pair and certificate in response to an authorized consumer request.

The present invention will enable the establishment of a trusted third party service to market demographic and other valuable marketing type information to manufacturers, distributors, and other marketing concerns, while protecting an individual's identity. Fuzzy logic matching is used to match merchant and consumer, on an anonymous basis so that neither knows the identity of the other, and allow consumers to search, shop, and negotiate anonymously, with only items that match their interests being brought to their attention by the service.

The system information bank may also serve as clearing house and mint for value exchange units created for use as coupons, tickets, tokens and other loyalty schemes. All of units will go through essentially the same creating, capture, redemption, and automated clearing functions. The information bank can provide services related to the creation and maintenance of loyalty programs. These coupons, tokens, etc. can be stored in the information bank and temporarily distributed to or tracked by, for example, an electronic wallet. For purposes of this disclosure an "electronic wallet" is a virtual container for the various information and financial application a user might want to be mobile. The information is generic in nature, and the "wallet" can be made to hold a heterogeneous collection of applications that are not necessarily affiliated, or even offered by the issuer of the wallet. The applications can be added "ad hoc" after issuance of the wallet. Although not required, one example of an implementation of the "wallet" is through the use of "smart card" technology of the type well known to those of ordinary skill in the art.

The system of the information bank also provides the ability for consumers to specify certain important events of which they wish to be reminded or notified. The consumer can also define a notification hierarchy or priority, e.g. cell phone, work number, e-mail, home number, etc. and the tenacity built into the system for notification for each event.

The "information bank" also includes the ability to provide an anonymous shopping service which allows the shopper to span multiple merchant sites and shopping services. The information bank intermediates the consumer shopping by assigning the consumer a different alias for each site in order to make cross correlation by data scavengers more difficult. Orders to popular merchants are consolidated and paid in a lump sum. Consumers are billed internally by the information bank, so no consumer payment identification information crosses the Internet or is made available to merchants. Consumers may have goods shipped to a drop address from which a third party re-ships the goods to the consumer so that the merchant never knows the identity of the consumer, and the re-shipper does not know shipment contents.

The service also provides Internet and point of sale identity protection. By substituting the consumer account name with a random number every time the user's information is sent over the network, the information bank keeps track of the aliases it generates and internally routes responses to appropriate parties while preserving anonymity.

BRIEF DESCRIPTION OF THE DRAWINGS

Having briefly described the invention, it will become better understood from the following detailed discussion, viewed with reference to the attached drawings, wherein:

FIG. 10 is an overview of how certain events trigger notification to consumers using the system;

FIG. 11 shows how the system may be implemented to provide consumer information to merchants on an anonymous basis;

FIG. 12 is a table showing the different types of data in the different accounts of the system;

FIG. 13 is an architectural overview of an electronic wallet to be used in the system.

DETAILED DESCRIPTION

Figure 1:
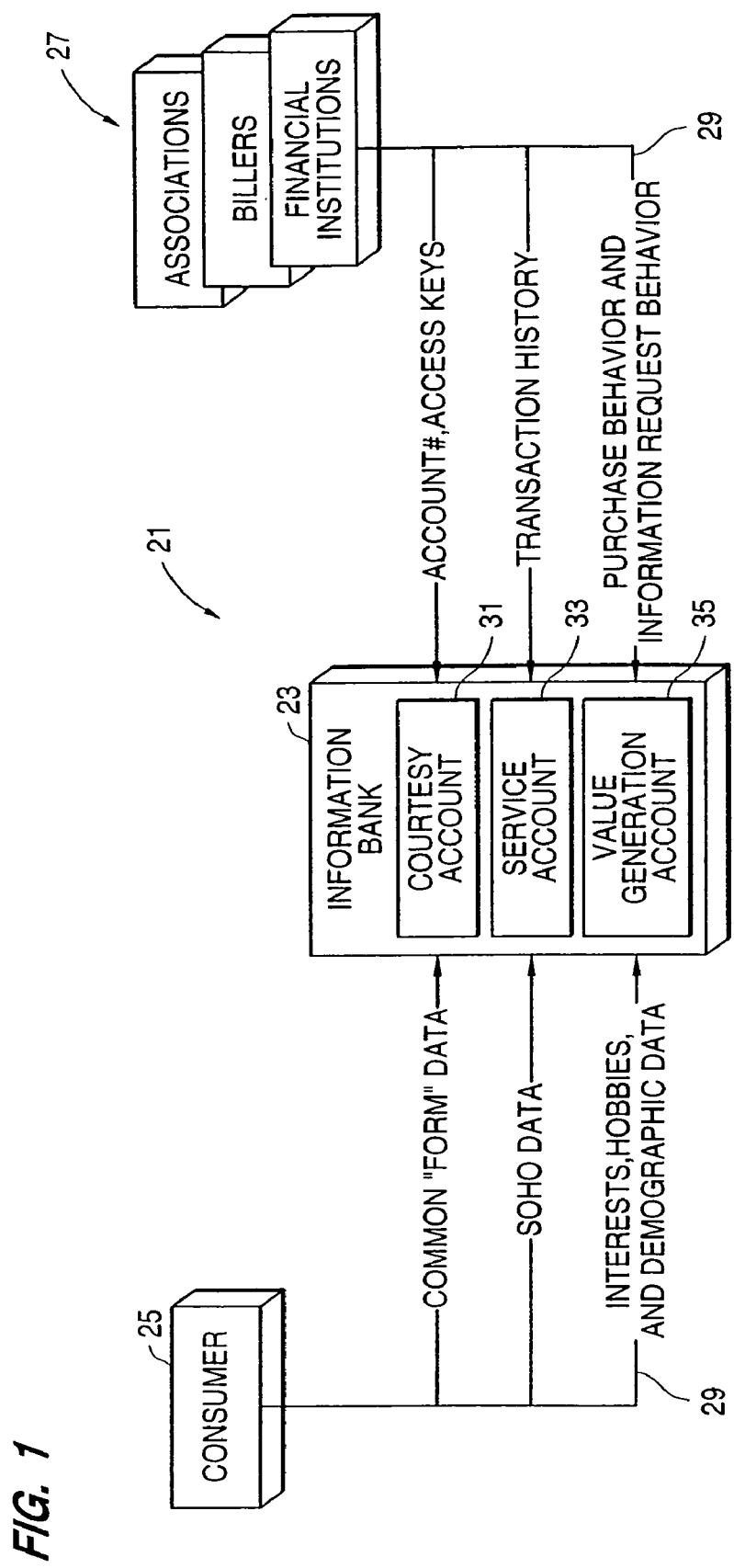
FIG. 1 presents a general overview of an embodiment of the present invention.

The information banking system which includes a distributed network based electronic wallet provides a means for consumers to interface with both the information bank and third-party providers of goods, services or information who are referred to herein as merchants. In FIG. 1, the consumer 25 is shown either interfacing with an information bank 23 and various merchants or service providers 27. This can be done by the consumer 25 through a home PC or at a walk-up kiosk type device which utilizes smart card technology. Connection to the information bank 23 can be through conventional transmission lines 29 such as telephone lines, cable, wireless communication, etc. Regardless of the type of user interface chosen, the consumer communicates through the network 29, to the information bank 23 and/or the merchants or service provider 27. The network may be a closed network, accessible only to the consumer 25, the information bank 23 and approved merchants or providers 27, or it may be a network such as the Internet, where all transactions are conducted in a secure manner well known in the art through appropriate encryption. The information bank 23 can be made up of a conventional server with appropriate data storage. Within the data storage, separate files or accounts can be defined as will be readily apparent to those of ordinary skill in the art. Communications between the server and other users/devices is achieved by conventional means such as a telephone modem, cable modem or other like established and well known systems.

In FIG. 1 there is shown an overview of the types of accounts which will be maintained at the information bank 23 and the types of information retrieval which the consumer 25 can control. The consumer's authorized information will be either requested by or relayed to various merchants or service providers 27 consisting of associations, billers, or financial institutions with whom the consumer 25 wishes to transact business. One type of consumer account is known as a courtesy account 31 and holds certain home or personal information, such as the name, address, phone numbers, e-mail address, birthday, social security number, mother's maiden name, spouse's information and other familial information which is commonly needed to fill out forms or otherwise identify the consumer to those with whom they do business. This type of data is typically known however as "static identification data" as has been described and will become clearer further herein.

A second type of account is a service account 33 which is maintained for the benefit of the consumer and contains "moderately dynamic personal data" about the consumer 25, as well as software programs which can be accessed by the consumer 25, and which may be accessed or populated by various merchants or service providers 27 as authorized by the consumer 25. For example, banking accounts, insurance information, tax returns, and other consumer data can be stored in the service account. This data is characterized by being a large amount of data which is dynamic and stored over long periods of time. It can be used for functions such as bill presentment/payment, relationship management, tax preparation, and other purposes as will become clearer further herein.

FIG. 1 also shows a third type of data known as "dynamic demographic information data" which is kept in a value generation account 35. This file or account 35 is provided as a means for the consumer 25 to define certain demographic data, including a generic consumer profile, interests and hobbies, and the types of information the consumer would like to receive from third parties. This information is stored in the value generation account 35. Upon request by a third party merchant or service provider 27, a profile or aggregate of consumer information may be provided to the third party merchant or service provider by the information bank 23 for a fee. The profile or aggregate of information about participating consumers will not provide information which identifies individual participating consumers, but will rather provide the third party merchant or service provider with sufficient information to determine if it will request that the information bank provide consumers with advertisements of its merchandise or services. Merchants or service providers 27 will likely agree to pay for this aggregate consumer data and for indirect access to the consumers whose information is contained in the data bank because it will enable the merchant or service provider 27 to direct specific offers to a targeted market in an efficient manner.

Figure 2:
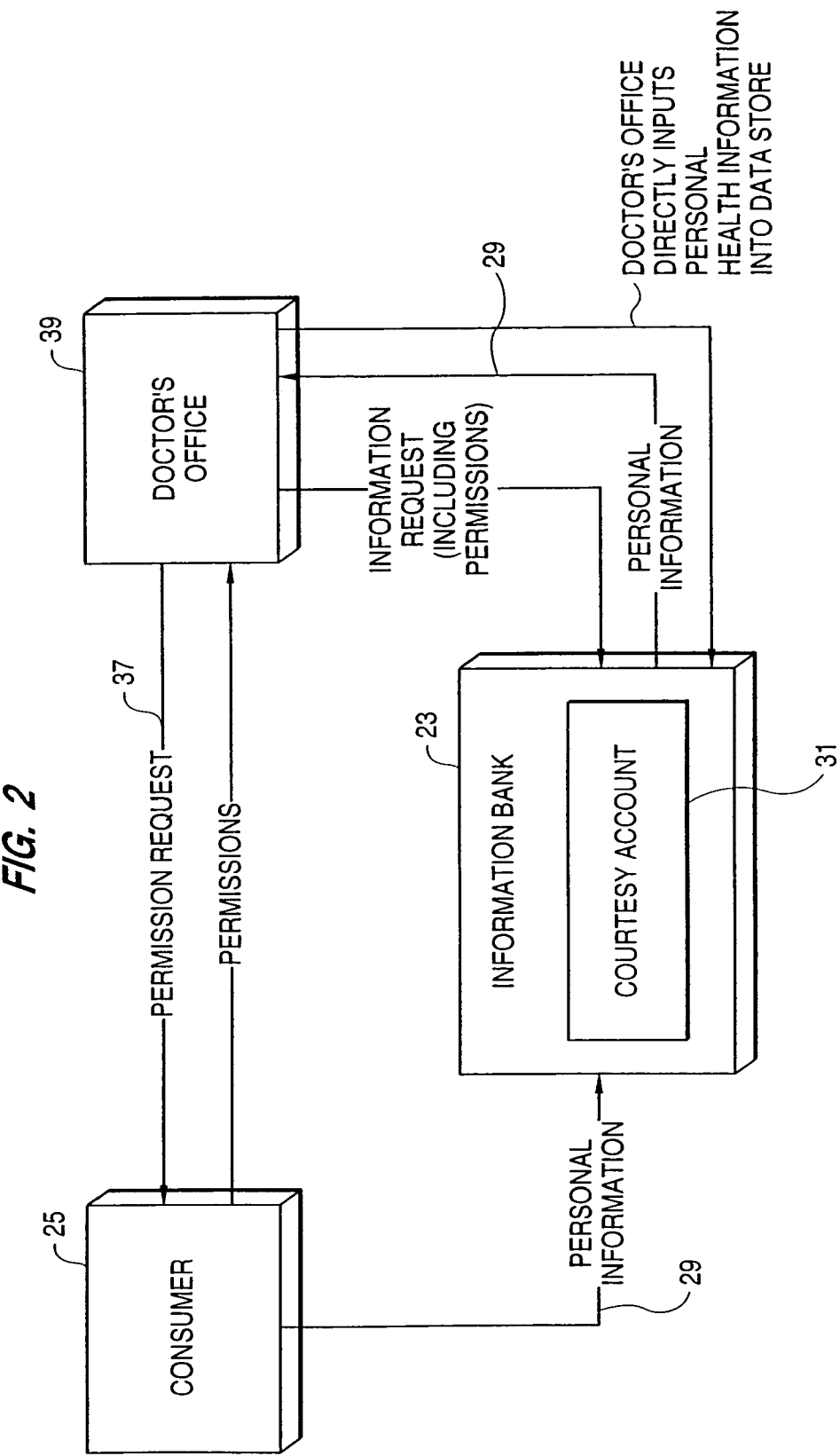
FIG. 2 presents a general overview of a use of a first specific data store as implemented in the system.

FIG. 2 illustrates, one example, of how the courtesy account can be used as a form filling service. In this figure, there is a three-way relationship between the merchant, in this case a doctor 39, the consumer 25 and the information bank 23. First, the merchant, or in this case, a doctor 39 will send a permission request for information to the consumer 25 through a separate connection 37 which can be the Internet, a dedicated line, a phone call, etc. The consumer 25 will then send a permission message, including a verifiable signatures, back to the doctor 39. The doctor 39 will then forward an information request through, for example, use of communication device, including a now verifiable permission to the information bank 23. The information bank 23 will verify the permission as being valid for this particular consumer 25 before forwarding the consumer's personal information to the doctor's office 39. The information in this scenario is originally entered by the consumer 25 directly into the information bank 23. It is also expected that a merchant or a service provider, such as a doctor, who maintains information about an individual, such as a history of immunizations, could have such information directly transmitted to the information bank when the doctor is authorized to do so by his patient. This would give the patient/consumer the convenience of having the merchant or service provider provide the Information Bank with a medical history or with update information, such as a recent immunization, about the patient/consumer without the inconvenience of the patient/consumer having to manually forward such information to the Information Bank which would then have to take the additional step of entering the data. This would also save the doctor the cost of storing the records.

Of course, this type of service is not limited to form filling. In a more general sense, the Information Bank allows the consumer to grant conditional, single access or limited access to service providers or merchants such as tax specialists, loan brokers, financial planners, and similar entities, which typically use information provided by a consumer. After retrieving the consumer's information, these entities may generate compilations and/or analysis of the consumer's data and, for example, prepare a tax return, loan application or financial plan for the consumer. The service provider could then either return the prepared document to the consumer or directly file documents such as a tax returns if authorized to do so by the consumer. Resulting information might also be incorporated into the consumer's information stored in the Information Bank for future access and/or analysis.

Figure 3:
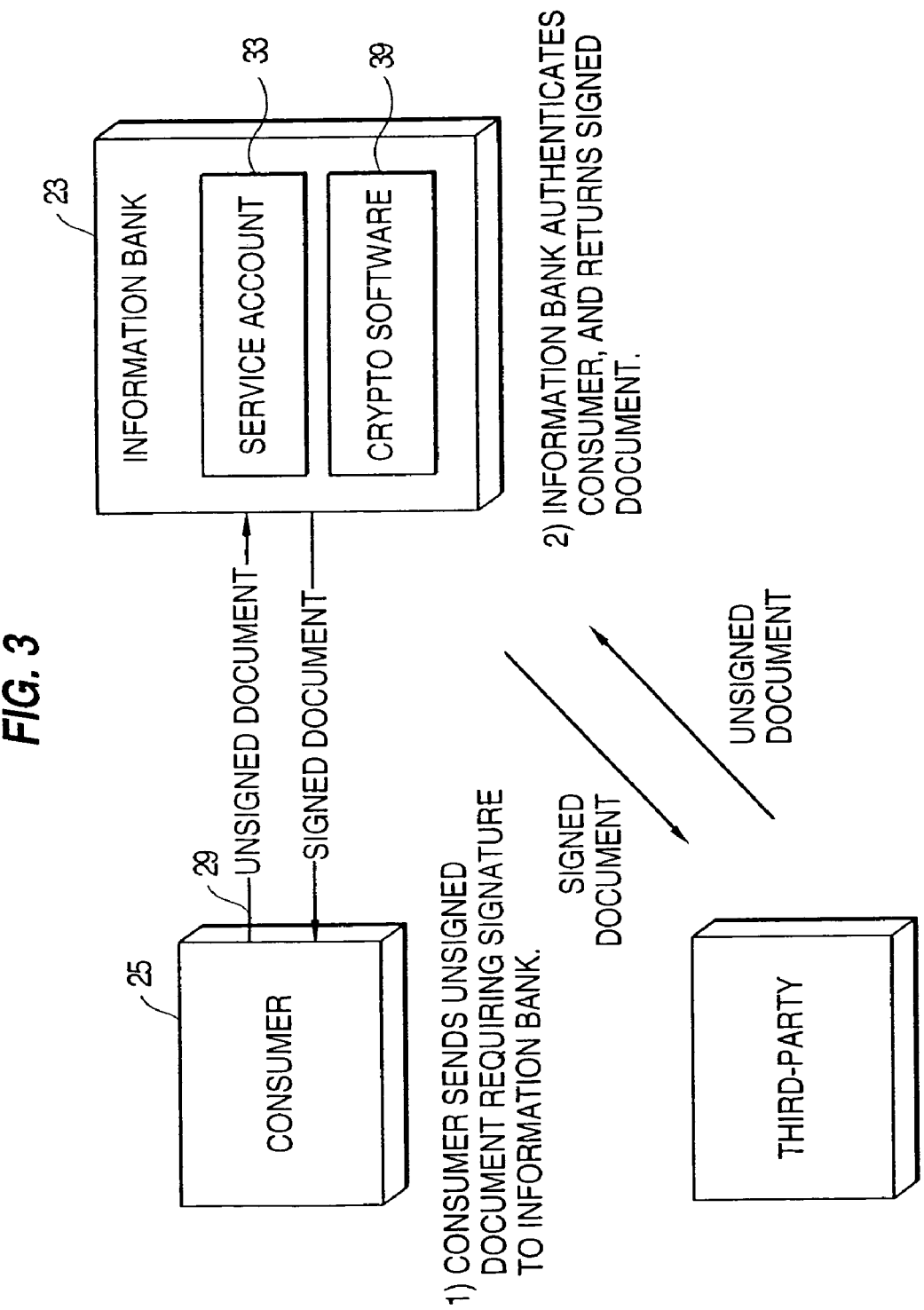
FIG. 3 presents a general overview of a use of a second specific data store as implemented in the system.

FIG. 3 depicts the use of the information bank service account 33 to provide a signing service. Such a service may be provided where a consumer 25 requests such a service and provides the service institution with adequate authorization, such as a power to attorney, to provide signatures for the consumer. As shown in this diagram, the consumer 25 forwards an unsigned document to the information bank 23 where cryptographic software 39 which is conventional in nature and well known to those of ordinary skill will be used to authenticate the consumer 25 and generate a signed document for return to the consumer 25. Also, it is expected that the consumer may authorize the information bank to sign certain documents for the consumer which have been transmitted to the bank by third parties. In such a case, the consumer would review the document and instruct the information bank to sign the document. The information bank could then return the document to the consumer or to the third party if requested by the consumer.

Electronic commerce requires certain trust components be implemented for signing services. More specifically, current digital signing procedures require parties in electronic transactions to provide critical trust components such as encryption and non-repudiation services. The current public key infrastructure (PKI) which is promoted by various vendors involves certificate authorities (CA's). For the power of attorney signature service described above, the information bank would provide the required key and certificate authority without requiring access to any private verification information or key possessed by a consumer, but would instead provide all authentication services through the information bank service. The information bank would in turn require adequate authentication from the individual consumer for execution of the signing service.

By implementing a digital signing service with appropriate software 39, the information bank 23 can be used to remedy or eliminate many of the issues related to registration, certificate issuance, certificate verification and certificate revocation lists (CRLs). This also reduces the size of the data transfer required for a verified transaction, because a standard certificate includes the certificate holder's identity, the certificate serial number, a certificate holder's expiration dates, a copy of the certificate holder's public key, the identity of the CA, and the CA's digital signature which is used to confirm that the digital certificate was issued by a valid agency.

Figure 4:
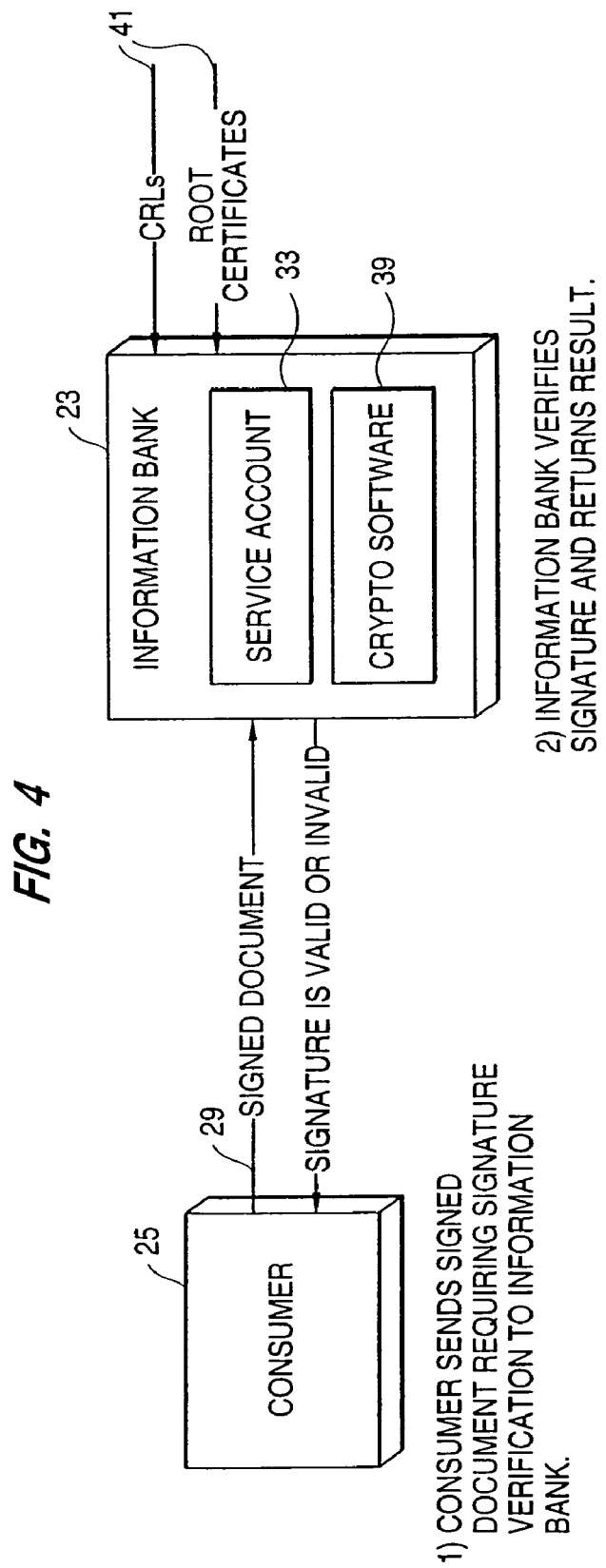
FIG. 4 presents another general overview of a use of a second specific data store as implemented in the system.

The present invention also provides for digital signature verification and notary services. This is illustrated in FIG. 4. Current PKI solutions require several components in order to verify the integrity of a digital signature. Besides the document and the signature itself, all certificates in the chain to a trusted root and access to the CRLs for each CA must be available. These components are then fed into a software program that verifies first, that no certificate was on a CRL at the time of signature; second, the integrity of each certificate in the chain based on the public key of the next higher certificate in the chain is unquestioned; and third, the integrity of the original document. A consumer 25 wishing to perform this process needs access to this software, but they must also trust the software that's performing these checks. That is, if the software provides a valid or invalid signature result, but the software is not adequately safeguarded on the consumer's machine, then any result provided by this software is suspect.

The signature verification function offered by the present invention provides a simplified and trusted method for verifying the integrity of additional signatures. A consumer 25 is not required to understand the intricacies of CRLs and is not forced to load cryptographic software onto his access device. Instead, the consumer 25 just forwards the signature and request to the information bank 23, which performs the appropriate checks. In this case, the cryptographic software 39 is already loaded into the information bank 23, but the CRL and root certificate are provided through line 41 to the information bank 23 to perform the verification for the consumer 25. An alternate function, somewhat related to signature verification, is an actual signing function. In providing a signing function, the information bank 23 accepts an unsigned document and signs it on behalf of the consumer 25. Another benefit of off-loading the signing and verification process to the information bank 23 is that is reduces the overhead on the consumer 25 device. It takes quite some time to generate a 1024-bit key pair using a browser on a current Pentium processor. The information bank 23, however, will be running this software on a state-of-the-art machine as previously discussed, which is capable of quickly performing this function. Furthermore, the information bank 23 will operate in a secured environment which will eliminate any questions related to software integrity, and will provide access to all required CRLs and route certificates from the appropriate X.500 directory structures through connections 41, many of which are likely to be stored in local cache memory. The information bank 23 also functions as a secured backup and storage facility service.

As more and more consumers begin to use electronic commerce and related electronic bill paying services, consumers will need to maintain important home records related to these transactions on their own PCs. The consumer may soon have access to and require safe storage for electronic copies of insurance policies and other legal documents. Many consumers already create large amounts of data with personal financial software, such as those commercially available under the names Quicken or Turbo Tax. The secured backup and storage service provided by the information bank 33 provides the consumer 25 with the capability to safely and securely store important documents on servers which are professionally managed and reside on information bank 23 hardware. Storage remote from the consumers' PC provides a disaster recovery plan and mitigates any problems associated with hard disc crashes, fire or theft.

Figure 5:
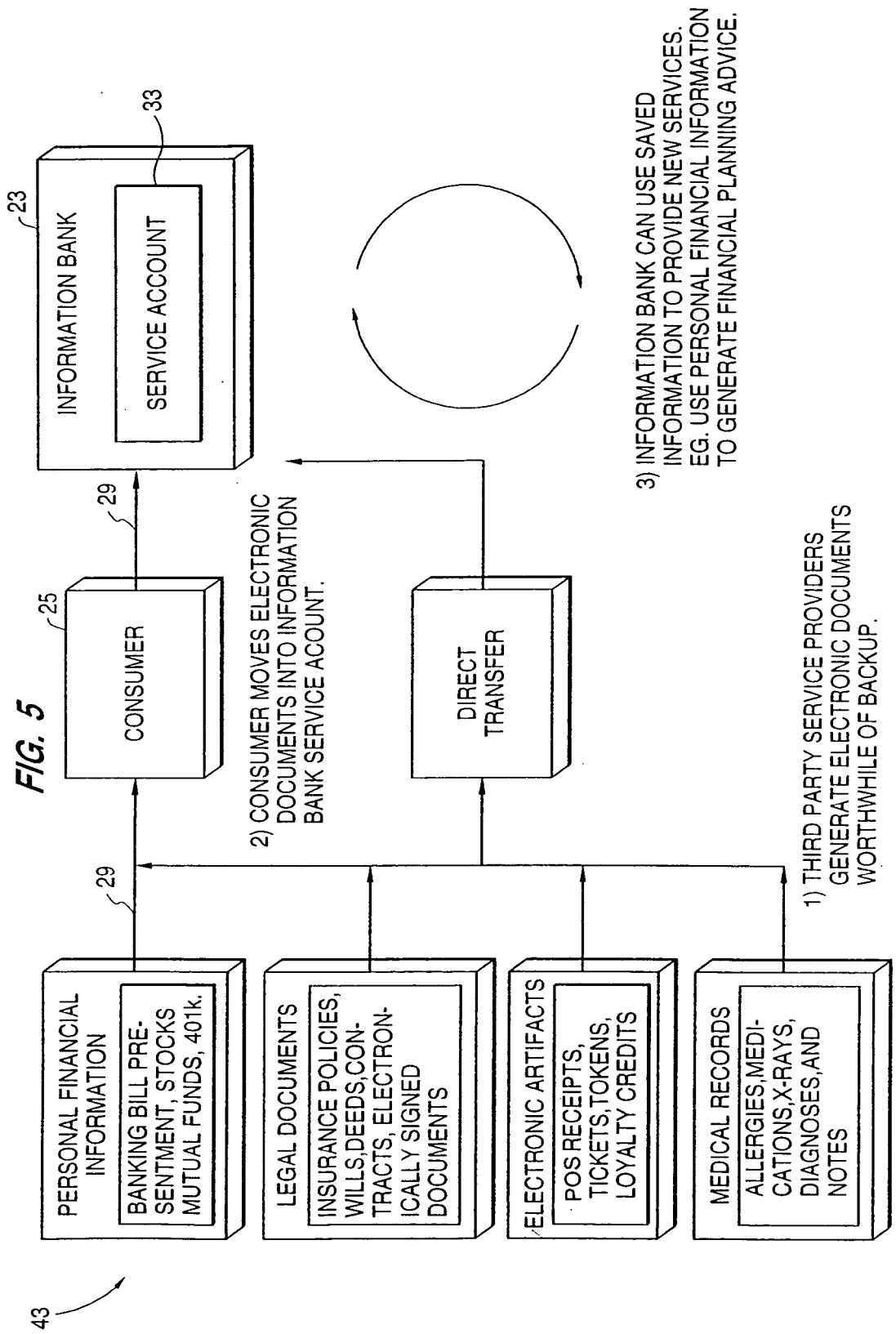
FIG. 5 presents a general overview of how a consumer inputs information or data into the second specific data store of FIG. 3 or 4.

FIG. 5 provides an overview diagram of the types of personal financial information which will be resident on or managed by the information bank's secured backup and storage devices. Personal financial information, such as banking, bill presentment, stocks, mutual funds, 401K accounts or IRAs, all collectively identified with the number 43, can be transferred to the information bank through connections 29 under the consumer's control. Legal documents such as insurance policies, wills, deeds, contracts and other electronic commerce documents can also be forwarded to the information bank 23 for secure archival. Electronic artifacts, such as coupons, point of sale receipts, tickets, tokens and other forms of loyalty credits can be made by the consumer 25 and tracked in the information bank 23 in a secured manner. Important medical records will increasingly be created and stored electronically by medical service providers, and such records of consumers' allergies, medications, past x-rays, diagnoses and doctor's notes can be stored by the consumer 25 and securely and confidentially saved at the information bank 23 in the service account 33 for release only as approved by the consumer 25. In the preferred embodiment the consumer 25 would instruct the third party merchant to forward this information directly to the information bank 23 and it would then be stored therein for the consumer. In an alternate embodiment, these financial and personal documents would be moved from the third party merchant to the consumer 25 and then forwarded by the consumer to the information bank 33.

Another office related service is the virtual office provided by the information bank 23. This service compliments the storage and secure backup by, for example, providing software for students, or for use at small offices or home offices. Suites of office software, including word processing or spreadsheet programs, could be provided for the cost conscious individual who has Internet access but does not necessarily have the resources to pay for, or the desire to continually update and manage, a home office software library. This can be provided by the service account 33 and implemented in a conventional manner well known to those of ordinarily skill in the art. Subscribers to this service would be able to execute the software when needed and would never have to worry about upgrades or system compatibility, which would be managed by the information bank 23 which transmits the software to the consumer 25 for use by the consumer 25 on the consumer's device, e.g., home computer.

The information bank 23 can be used to coordinate the consumer 25 information stored in the information bank 23 with third party service providers in order to more conveniently allow the consumer 25 to use the third party services. For example, the information bank 23 may be used to provide software which will facilitate the downloading of certain consumer information to printing services or in case of emergency, to medical providers. The information bank 23 may also be programmed to release this information to, for example, executors of the consumer's estate if previously authorized to do so by the consumer 25. By being able to share information generated by various service providers, the consumer 25 will find that many previously burdensome tasks are now easily accomplished. In the preferred embodiment, this data will be stored in a self-describing format, such as the XML protocol for easy transfer to and use by various third parties.

Figure 6:
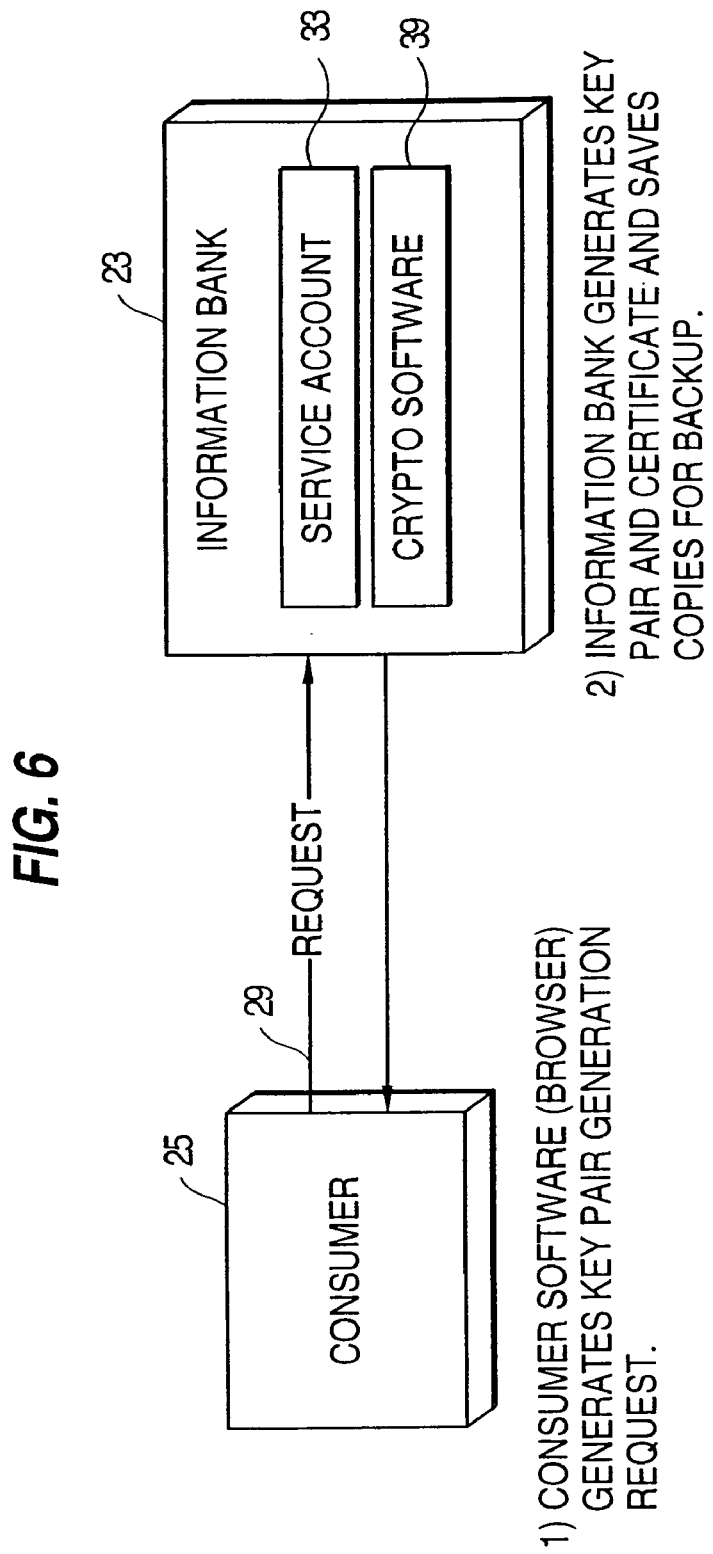
FIGS. 6 and 7 present a general overview of alternative ways of how consumers may access the second specific data store, i.e., the service account, in the system.
Figure 7:
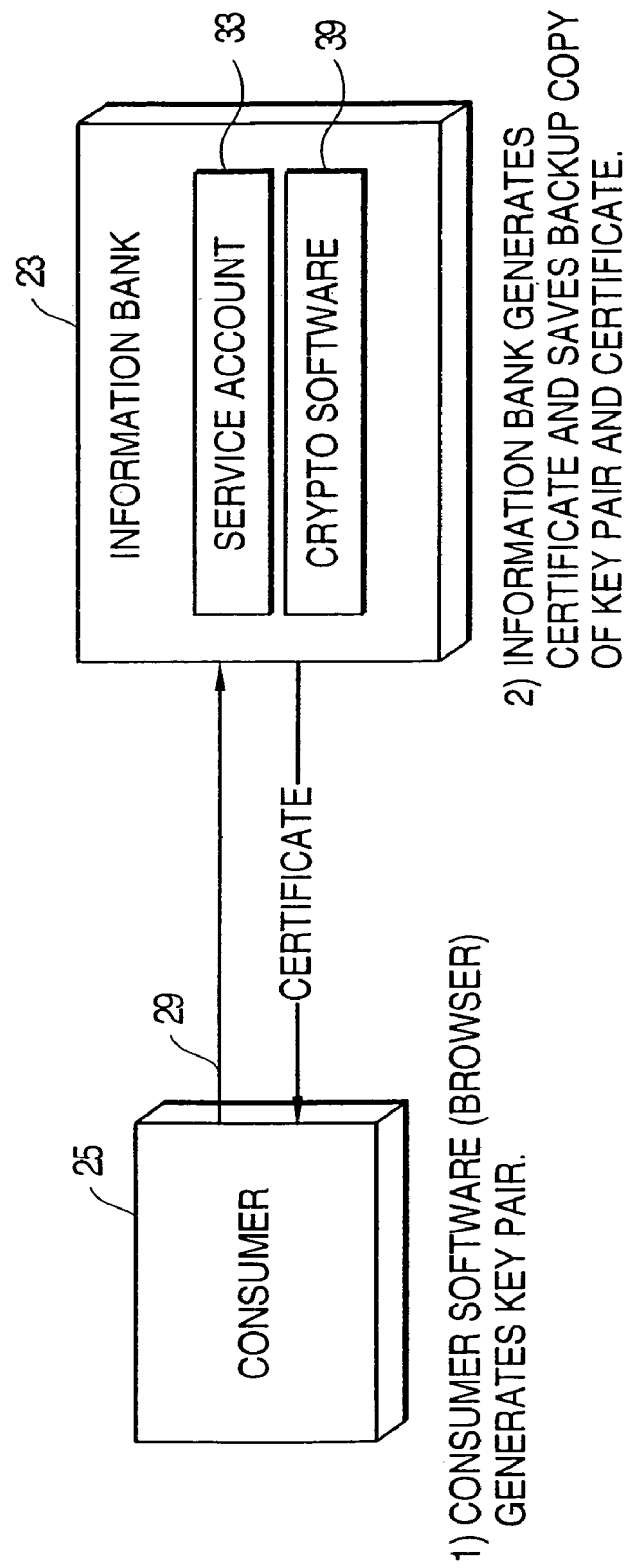

Both Netscape and Microsoft Corporations market web browsers which currently provide support for generating key pairs. However, if a user is so unfortunate as to suffer a disc crash or has failed to update the browser software, it is possible that a user could lose the keys forever. Once this happens, there is no way to retrieve the information previously encrypted with the keys. The information bank 23 may offer a key escrow and recovery function as further depicted in FIG. 6 to protect the consumer 25 against catastrophic key losses. In FIG. 6 the consumer 25 uses software, such as a browser, which can generate a key pair generation request and forward it to the information bank 23. The information bank 23 then generates a key pair and certificate, saves the key pair and certificate, and forwards them to the consumer 25 for use. A second option is shown in FIG. 7 in which the consumer 25 using browser software, generates the key pair and certificate and then forwards the key pair and certificate to the information bank 23 for archival. If the consumer 25 ever loses a key pair, the consumer 25 can request and receive a replacement copy from the information bank 23. To accomplish all of this, of course, cryptographic software 39 is required, the details of which will be readily apparent to those of ordinary skill in the art.

The information bank 23 is configured to generally facilitate electronic transactions and make the consumer's life easier and more convenient. The value generation account 35 to be discussed in greater detail hereafter, can be used to provide assisted product, service, or information searches which not only make consumers' lives more convenient, but also provide consumers with some value in return for using the service. This value may be in the form of monetary compensation or it may be in the form of loyalty credits with preferred merchants selected by the consumer 25. This is an optional service and is completely controlled by the consumer 25. The consumer 25 can make their hobbies, personal interest and demographic information available, while keeping their identity private. A consumer profile is compiled by the information bank 23 from both explicit and implicit information. The consumer 25 is given full control and can specify constraints on information and specifically exclude certain information from product, service, or information search categories. Merchant offers which satisfy the consumer criteria are forwarded by the information bank 23 to the consumer 25. In this system, the merchant will not know the identity or address information of the consumer 25, nor will the consumer 25 know who the identity of the merchant. The information provided must be presented with a summary demonstrating how it satisfies the original interest of the consumer 25 and may include short promotional information. The consumer 25 has the opportunity to request more information or request a purchase. Up to this point, the advertising provided from the merchant to the consumer 25 has been free to the merchant. This allows the merchant to get real time demand statistics and other valuable aggregate indicators of the quality of their offer free of charge. However, in order to complete the final transaction, a fee is required for the merchant to continue. In this way, these advertising dollars are spent by the merchant, knowing they are highly correlated to a targeted sales market.

Figure 8:
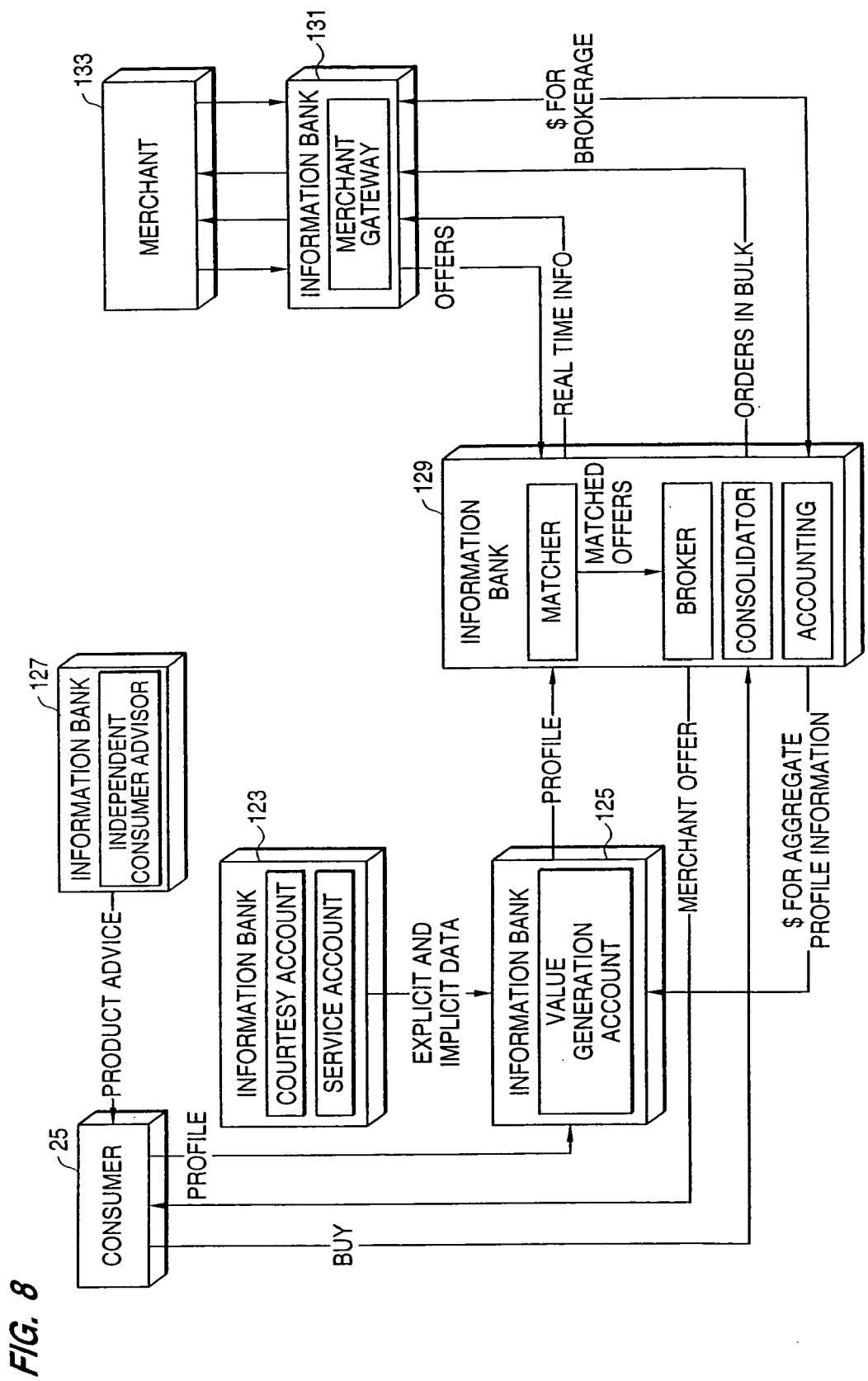
FIG. 8 is a detailed overview of the use of a third specific data store as implemented in the system, in combination with the use of the first and second specific data stores.

FIG. 8 illustrates such a process where the consumer information from the consumer 25 device is entered into the information bank value generation account (previously numeral 35 in FIG. 1) in the form of a profile. In this case, the information bank 23 is shown as consisting of an information bank portion 123 consisting of the courtesy account and service account previously discussed. The information bank 23 will also include the value generation account module, i.e., number 125 herein, an independent consumer advice module 127, a transaction module 129 providing, matching, brokering, consolidation and accounting functions, and a merchant gateway module 131 which connects to the merchant 133. In this embodiment, the value generation account module 125 takes input from the courtesy and service accounts 123 in the form of explicit and implicit (mined) data. The consumer 25 profile is updated from this data and is provided to a module 129 having a matching function running in the information bank 23. The matching function also is connected to receive offers from a merchant gateway module 131 which is connected to the merchant 133. Merchant offers which sufficiently match the consumer 25 profiles will be forwarded by the information bank 23 to the consumer by the module 129 for review. When a consumer 25 indicates interest in a particular offer, they will issue a request or a buy request back to an information bank consolidator function in module 129, which will then forward this to the merchant 133, either individually or in bulk with other consumer offers. The merchant 133 will then pay a fee for the brokerage service and portions of this will be split by the information bank 23 and allocated to particular consumer accounts as appropriate. This function also includes an independent consumer advisor module 127 which includes data available to the consumer 25 for reference, and provides background information about various merchant offers.

The fees paid by a merchant for access to the consumer information could also be structured such that the fee would increase based upon the type of usage by the merchant. For example, a certain fee could be assessed for access to view a customer information summary. The fee would then be increased if the merchant chose to request that information be provided to individual consumers. A further fee increase might be levied if a consumer chose to respond or purchase a merchants product after being solicited through the information bank. Other tiers of services and fees are also contemplated.

The information bank 23 may also be programmed to provide, for example, a coupon, ticket, token and loyalty management program in which the information bank 23 serves as a mint and clearinghouse for units created for use as coupons, tokens, tickets and other loyalty schemes. Although exhibiting a wide variety of outward appearances, the internals of the minting, capture redemption and automatic clearing functions would work essentially the same. This function is valuable to the consumer 25 because of added functionality in an electronic wallet (to be described hereafter) to keep track of various coupons, tokens and ticket acquired by the consumer.

Figure 9:
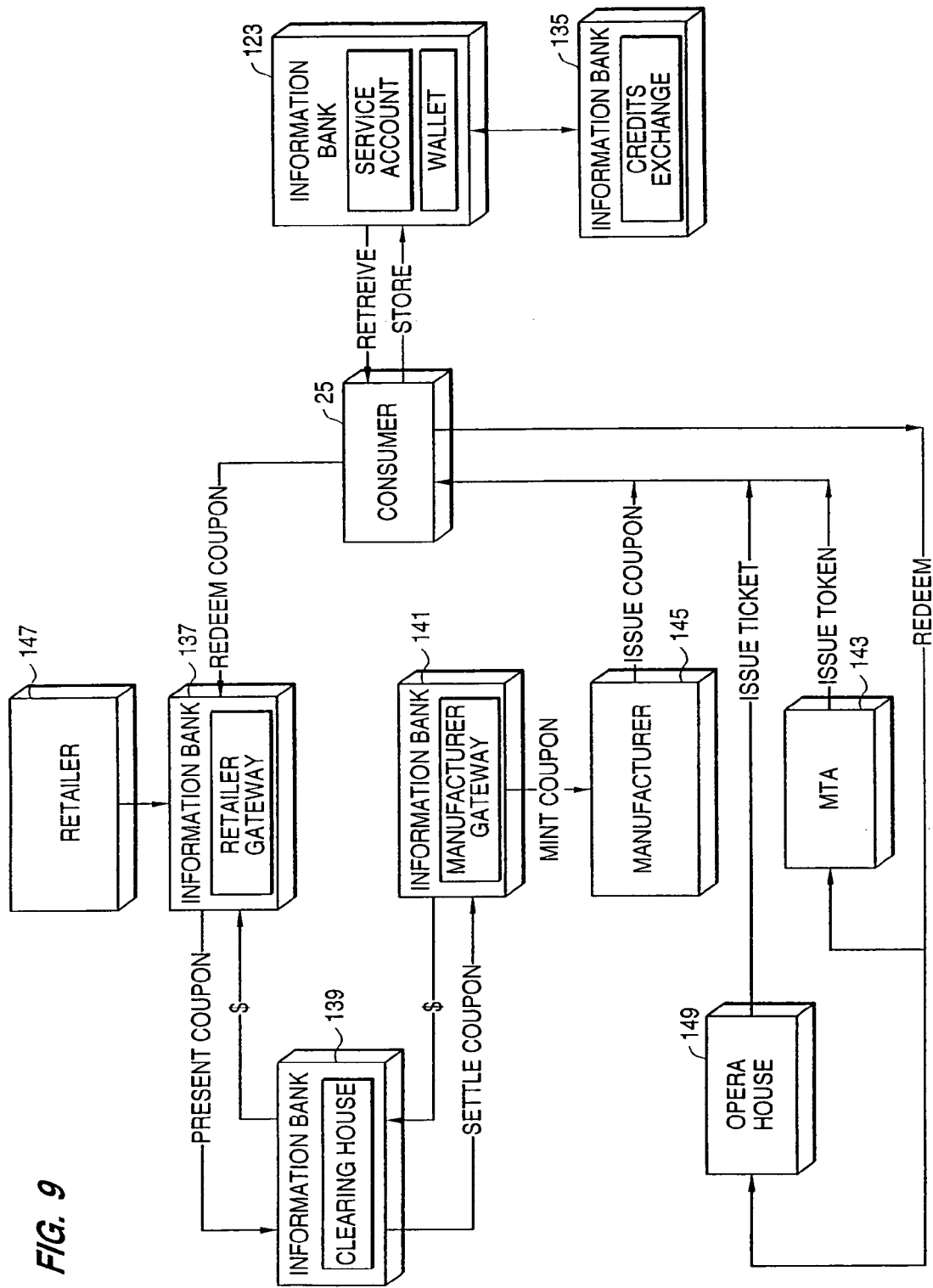
FIG. 9 is an alternate overview of the use of a third specific data store as implemented in the system.

A coupon and loyalty management program is depicted in FIG. 9 as including several components of the information bank 23. These components include a clearinghouse module 139, a retailer gateway Module 137, a service account Module 123, credit exchange module 135, a manufacturer gateway Module 141, and interfaces to merchants who can be either retailers 147, manufacturers 145 or service providers, such as an opera house 149 or ticket issuer 143.

As further shown in FIG. 9, the information bank manufacturer gateway module 141 can be programmed to mint a coupon and issue this via the manufacturer 145 electronically to the consumer 25 who will then store the coupon in the information bank service account 33 or in an electronic wallet therein. Coupons may be issued by manufacturer, distributors and/or retailers, and tickets may be issued, for example by various entertainment and/or educational concerns. Tokens are issued by a wide variety of concerns ranging from transportation authorities to entertainment establishment. Almost any retailer or business could create a loyalty program using tokens. The consumer 25 in receipt of a coupon, ticket or token would store these in a service account or smart card electronic wallet. When the consumer wished to redeem these coupons, they would forward them to the information bank retailer gateway module 137 which presents the coupons to the information bank clearinghouse module 139 for settlement. The information bank manufacturer gateway module 141 then would issue an appropriate credit back through the information bank clearinghouse module 139 to the appropriate retailer 147 in exchange for the redeemed coupon. All of these functions can be implemented routinely by those of ordinary skill in the art using existing hardware and software tools and devices once the broad functionality described in detail herein is known.

As shown in FIG. 10 the information bank can also provides an important event, notification and response function. Such a function serves to allow the consumer 25 to specify certain events that are important to the consumer 25. Such events could be birthdays, stock price movements, loan availability, extraordinary bill charges, personal information requests, etc. The consumer 25 can establish a hierarchy for the information bank 23 to locate the consumer 25, such as trying the consumer cellular phone first, then a work number, then e-mail, then a home number. When an event occurs that matches a trigger, an event notification is generated by a monitor program 151. The priority of the event would determine the degree of tenacity the service asserts in order to notify and obtain notice of verification from the consumer 25. This process is shown in FIG. 10, where the consumer 25 sets specific event triggers and stores these in the information bank service account 33. The information bank then constantly monitors the event notifications with the monitor program 151, and when there is a match for a trigger event, the information bank 23 provides notice back to the consumer 25, based on the notification hierarchy previously defined by the consumer.

The information bank also provide an anonymous shopping service. This service, as shown in FIG. 11, allows several components of the information bank (such as the service account 33, an anonymizer module 153 which assigns an alias to all consumer transactions, an order payment consolidator module 155, a junk e-mail investigator module 157 and a reshipper module 159 to work together to provide an intermediate shopping service which allows the consumer to browse certain merchant displays over the Internet without revealing their identity. The modules and functions described are conventional and well known, for example, from such services already available from certain web service providers. However, to date, no one has integrated the noted functions and modules into a coherent functioning system as provided by the present invention.

The anonymous shopping feature is similar to the assisted product, service, and information search, but this feature assumes that the discovery and comparison work has already been done, either through merchant offers forwarded to the consumer, or by the consumer's independent investigation.

This feature is more like a "shopping cart" on a website or service provider site on the Internet, where the shopper can span multiple merchant sites and shopping sessions and create a consolidated order. The information bank 23 serves as an intermediary for the consumer 25. The identity of the consumer 25 is replaced by an alias that is remembered by the function for subsequent reference. A different alias can be used for each merchant site, making it difficult for data scavengers to cross-correlate consumer purchases based on the alias. Junk e-mail originating from unknown sites can be traced to the site selling the address information via the alias.

This function consolidates orders to popular merchants and pays these merchants directly in a lump sum, together with a summary of orders and corresponding ship-to addresses. The consumer 25 is billed internally so that their credit card and other identification information is never exchanged over the Internet.

For an additional shipping fee, the consumer has the option of having goods shipped initially to a drop box or reshipper address where a third party will take the goods and reship them to the consumer 25 at his/her stored address. In this manner the merchants never know the address or identity of the consumer 25. The packages are handled anonymously and a reshipping services does not know package contents.

With respect to the types of data stored by the information bank 23, as previously discussed, in particular with the first data store which is stored on the data storage mean, which includes static identification data, the second data store stored on the data storage and which includes moderately dynamic personal data, and the third data store which includes dynamic demographic information data, this is more clearly illustrated in FIG. 12. The courtesy count as shown in FIG. 12 includes the static identification data which is personal to a use having access to the information bank 23. The second data store correspondences to the dynamic personal data in the service account, and includes data about the user such as billing history, payment history, etc. The third data is the demographic data and will be stored in the interest bearing account to generate remuneration for the consumer in exchange for allowing use of that data. All of the types of data described have been previously discussed and are further expanded and illustrated in the table shown in FIG. 12.

Turning now to the use of an "electronic wallet" as previously described for use in connection with the system 21 of the invention, such a typical wallet 171 is shown in FIG. 13 which shows a typical architecture for such a wallet 171. The concept of an electronic wallet means many things to many people. One version would be a pocket sized computer with a snap shot-size color screen that will be used in place of many essentials that consumers carry around with them today such as money, keys, identification, credit cards, tickets, as well as items that provide the consumer with mobile information and communications such as a watch, newspapers, calculator, portable telephone, pager, etc. In this embodiment, the wallet 171 is a physical thing that is carried in the pocket. Because of its electronic nature, it can add functionality that the conventional wallet can not perform. However, consumer concerns about this type of device make it impractical. Although it is technically possible to back up the contents of the electronic device, the reality is that consumers would probably be at least as irresponsible with such a device as they are currently with their own data. Further, to the extent that such a wallet interfaces with providers of the wallet or others, there is a security concern in that information about the consumer could be used by others to make a profit and not let the consumer know about it. Thus, extension of the physical wallet, especially those offered by third party software or hardware vendors make rapid adoption unlikely.

At the other end of the spectrum is the totally virtual wallet. It is not a physical device, but a set of applications on a server somewhere. The major disadvantage of this approach is that all transactions have to be "on-line" or connected to a server. This could result in more expensive and/or less convenient use. Another issue is security.

A hybrid approach, and that preferred in accordance with the system 21 of the invention, is to put some data and applications on a physical device and some on a server. A smart card is ideally suited for this type of application since it makes the most sense to put the security and access functions on the card, and to put the volume of data and applications on the server such as the information bank 23. Further, those transactions that would be too expensive to have on-line, such as small amounts of electronic cash transactions, also makes sense to have on a such a smart-card. Thus, as shown in FIG. 13, the electronic wallet 171 in one embodiment is made up of an e-cash applications container 173, an electronic cash application manager 175, a use or authentication module 177, a key to application manager 181, a key ring applications container 183, and external applications interoperability API (applications program interface) 179, and a user application organizer and manager 185.

The e-cash applications container 173, as the name implies, is storage for e-cash applications. In order to gain critical mass, more than one type of e-cash is supported. The storage in container 173 is sufficiently generic to only record each of its members as being some form of e-cash and the actual "object" in the container 173 is a "connector" to the real e-cash application. The programming provides that the e-cash application can be located and started. The e-cash manager 175 is software that provides how to add e-cash applications and use them in a generic manner. The user authentication module 177 can be replaceable to allow for growth in the security and authentication technologies. Prior to implementation of smart cards, it could be software that asks for an account number and personal identification number, but with current technology, it can be implemented using the card and a server, using authentication technology implemented today. For future purposes, alternative security and authentication technologies might use biometrics, etc.

The key to application manager 181 serves to manage non-cash applications in the wallet such as credit, debit, e-checks, identification, facilities access and other applications. This is the software that maintains the contents of the key ring application container 183. The key-ring container 183 holds the connectors to server applications. The contents are managed and maintained by the key to application manager 181 previously described. Even as smart cards become more commonly available, it is believed that they will not be sufficiently large to actually hold the applications. Instead, they will hold "connectors" to the applications that reside on a server. The most important aspect of a "connector" is a key or certificate that helps identify an authorized user of the application. The "key ring" then is a container of keys. They are not like the "real" keys, however, as further illustrated by FIG. 14 hereof.

Figure 14:
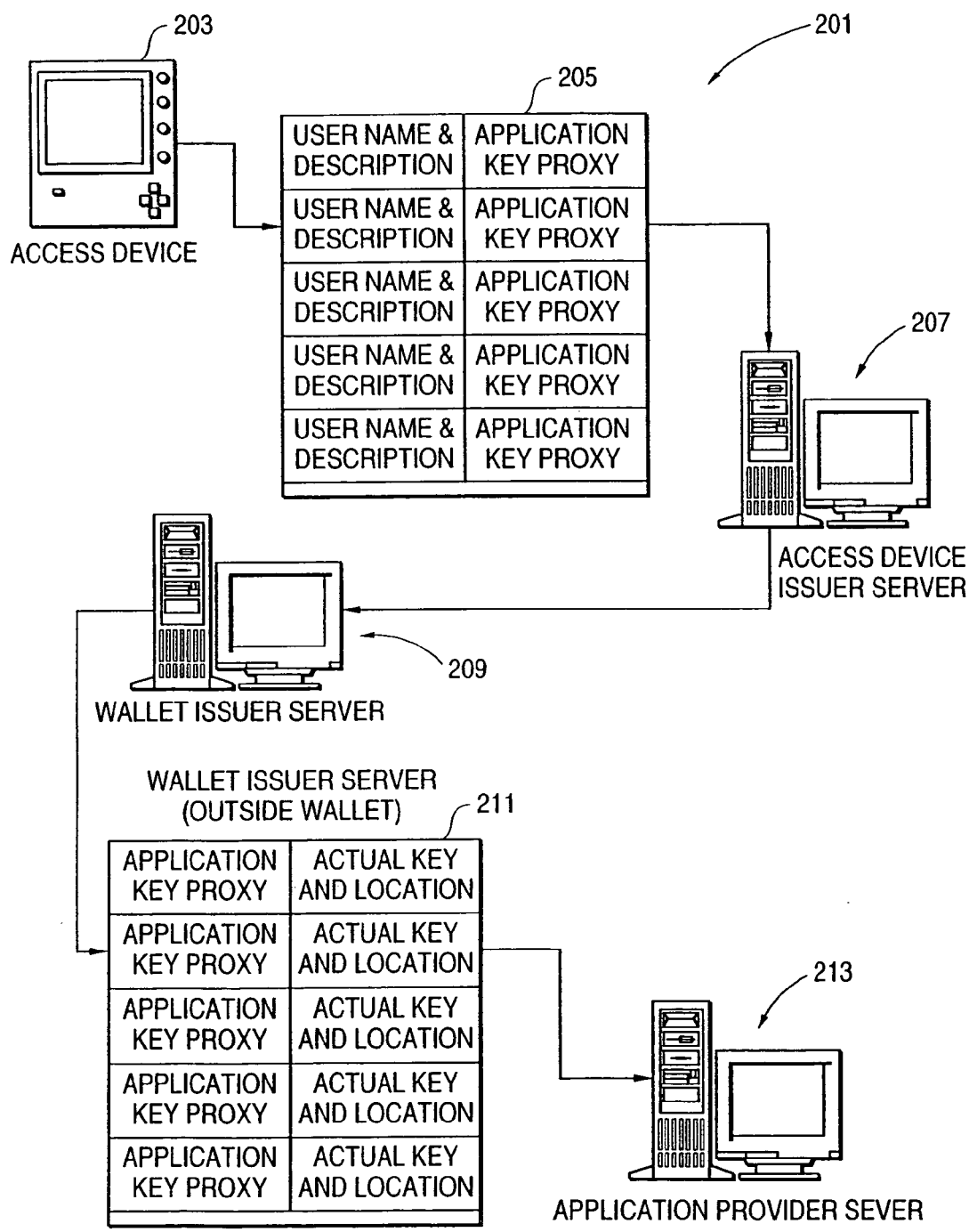
FIG. 14 illustrates a wallet and application access scheme.

More specifically, FIG. 14 illustrates a wallet and application access scheme 201. In this figure, the concept of an access device provider, wallet issuer and application provider have all been separated. As illustrated in FIG. 14, the consumer 25 can use an access device 203 to access their information 205. The access device 203 has been provided at point of sale, or point of contact by some party. The wallet then uses the access device 203 and the access device server 207 connection to the network to contact the wallet issuer server 209. The consumer 25 then identifies the appropriate application by their own description. The description is associated to a application key proxy 211 that is sent to the application provider server 213.

In the scheme 201 described, the consumer 25 can access their information via a device 203 provided at point of sale, or point of contact by some party. Since this party will want some presence other than the device 203, some "real estate" is set aside in the presentation interface for their content. The wallet 171 uses the device 203 and the devices server 207 connection to the network 201 to contact the wallet issuer server 209. The consumer 25, as noted previously, identifies the appropriate application by their own description. The description is associated to an application key proxy 211 that is sent to an issuer server 209. The issuer server 209 authenticates the user 25 and then looks up the location of the application and its real and actual key to be used for access to it. It then connects the consumer 25 to the application at the application server 213 and serves as a secure conduit.

As may be appreciated, proxies are used instead of actual keys in case the card is lost or stolen. In this manner, the coordination with many unaffiliated organizations to issue new keys is eliminated. The issuer simply issues a new card with new proxies on the card.

Such a system as will be readily apparent, can be easily implemented in the system of FIGS. 1–12 to provide enhanced functionality and flexibility.

Although the invention has been described with reference to these preferred embodiments and features, other similar embodiments and features can achieve the same results. Variations and modifications of the present invention will be apparent to one skilled in the art and the present disclosure is intended to cover all such modifications and equivalents.

What is claimed:

1. A method of transmitting purchase data in a database concerning a first consumer's order to at least one merchant independently of action by the first consumer, the method comprising:

storing a first data store made up of data comprising a first consumer's purchase data;

storing a second data store made up of data comprising a second consumer's purchase data;
extracting the first consumer's purchase data from the database;
extracting the second consumer's purchase data from the database;
combining the first consumer's purchase data with the second consumer's purchase data;
anonymizing the purchase data from the first and second consumers' orders into anonymous data; and
transmitting the anonymous data to the at least one merchant wherein the combining and anonymizing steps are performed independently of any input from the first or second consumer.

2. The method of claim 1 wherein the anonymizing is performed with respect to the first and second consumers' credit card numbers.

3. The method of claim 1 wherein the anonymizing is performed with respect to the first and second consumers' identification data.

* * * * *

UNITED STATES PATENT AND TRADEMARK OFFICE
CERTIFICATE OF CORRECTION

PATENT NO. : 7,200,578 B2
APPLICATION NO. : 09/190727
DATED : April 3, 2007
INVENTOR(S) : Cris T. Paltenghe et al.

It is certified that error appears in the above-identified patent and that said Letters Patent is hereby corrected as shown below:

On The Title Page, Item -56-
IN THE REFERENCES CITED (56) SECTION UNDER OTHER PUBLICATIONS -

Please add:

Written Opinion issued by Australian Patent Office for Singapore Application No. SG 9804644-4, dated December 29, 2000 (mailing date)

Written opinion issued by Australian Patent Office for Singapore Application No. SG 9804644-4, dated February 5, 2000 (mailing date)

Curtin, Dennis P., "APPLICATION SOFTWARE WITH WORDPERFECT, TWIN™/1•2•3®, and DBASE III Plus," Prentice-Hall International Editions, © 1988, ISBN 0-13-039718-8, pp. 464-547

Signed and Sealed this

Twelfth Day of June, 2007

JON W. DUDAS
*Director of the United States Patent and Trademark Office*